(12) United States Patent
Yim et al.

(10) Patent No.: US 9,624,117 B2
(45) Date of Patent: *Apr. 18, 2017

(54) ELECTROLYSIS BATH FOR ACIDIC WATER AND METHOD FOR USING THE ACIDIC WATER

(71) Applicants: SEEMS BIONICS INC., Gyeonggi-do (KR); MAG TECHNOLOGY CO., LTD., Gyeonggi-do (KR); Byounglyeol Kim, Gyeonggi-do (KR)

(72) Inventors: Shin Gyo Yim, Gyeonggi-do (KR); Jae Yong Lee, Gyeonggi-do (KR)

(73) Assignees: MAG TECHNOLOGY CO., LTD., Gyeonggi-Do (KR); Byounglyeol Kim, Gyeonggi-Do (KR); SEEMS BIONICS INC, Gyeonggi-Do (KR)

( * ) Notice: Subject to any disclaimer, the term of this patent is extended or adjusted under 35 U.S.C. 154(b) by 127 days.

This patent is subject to a terminal disclaimer.

(21) Appl. No.: 14/382,841

(22) PCT Filed: Aug. 19, 2013

(86) PCT No.: PCT/KR2013/007418
§ 371 (c)(1),
(2) Date: Sep. 4, 2014

(87) PCT Pub. No.: WO2014/035088
PCT Pub. Date: Mar. 6, 2014

(65) Prior Publication Data
US 2015/0021171 A1 Jan. 22, 2015

(30) Foreign Application Priority Data

Aug. 27, 2012 (KR) .......................... 10-2012-0093589
May 31, 2013 (KR) .......................... 10-2013-0062744

(51) Int. Cl.
*C02F 1/461* (2006.01)

(52) U.S. Cl.
CPC .. *C02F 1/4618* (2013.01); *C02F 2001/46157* (2013.01); *C02F 2001/46185* (2013.01);
(Continued)

(58) Field of Classification Search
CPC .. C02F 1/4618; C02F 1/46185; C02F 1/4619; C02F 1/46195
See application file for complete search history.

(56) References Cited

U.S. PATENT DOCUMENTS 3,623,969 A * 11/1971 Hushihara ............. C02F 1/4618
204/252
4,689,124 A 8/1987 Noding
(Continued)

FOREIGN PATENT DOCUMENTS

JP 09-195079 A 7/1997
KR 10-1998-0081448 A 11/1998
(Continued)

OTHER PUBLICATIONS

International Search Report (ISR) dated Dec. 16, 2013, for PCT/KR2013/007418, and English translation thereof.

*Primary Examiner* — Harry D Wilkins, III
(74) *Attorney, Agent, or Firm* — Bacon & Thomas, PLLC

(57) ABSTRACT

An electrolytic bath for manufacturing acidic water capable of ensuring sufficient conductivity through wide surfaces of electrodes and stability of the surfaces of the electrodes to electrolyze tap water as well as RO water or DI water, especially, by coupling electrodes having the same polarity as one to apply a power source to the electrodes having the same polarity at the same time without using an additional catalytic agent or ion exchange resin, and use of the acidic water are provided. In particular, an electrolytic bath for manufacturing acidic water capable of obtaining a high concentration of acidic water by further forming mesh electrodes having a polarity different from the plurality of (Continued)

electrodes on a surface of an ion exchange membrane to widen an area of the electrodes and minimize a distance between the electrodes, thereby further facilitating a redox reaction, and use of the acidic water are provided.

10 Claims, 3 Drawing Sheets

(52) U.S. Cl.
CPC ............... *C02F 2201/4618* (2013.01); *C02F 2201/46115* (2013.01)

(56) References Cited

U.S. PATENT DOCUMENTS

| | | | | |
|---|---|---|---|---|
| 5,534,120 | A * | 7/1996 | Ando | C02F 1/4618 204/269 |
| 5,900,127 | A * | 5/1999 | Iida | C02F 1/46109 204/280 |
| 6,183,623 | B1 * | 2/2001 | Cisar | B01D 53/22 204/252 |
| 6,251,259 | B1 * | 6/2001 | Satoh | C02F 1/46104 204/229.6 |
| 6,475,371 | B1 * | 11/2002 | Shirahata | A61K 33/00 205/464 |
| 6,500,458 | B1 * | 12/2002 | Shirahata | C02F 1/4618 424/466 |
| 6,547,947 | B1 * | 4/2003 | Uno | C02F 1/4672 204/263 |
| 9,359,231 | B2 * | 6/2016 | Lee | C25B 9/08 |
| 2002/0074241 | A1 * | 6/2002 | Natsume | A23L 2/50 205/688 |
| 2003/0056805 | A1 * | 3/2003 | Sumita | A61L 2/035 134/1.3 |
| 2005/0189237 | A1 * | 9/2005 | Sano | C02F 1/4618 205/746 |
| 2007/0148256 | A1 * | 6/2007 | Yanagihara | A23L 1/302 424/600 |
| 2010/0200425 | A1 * | 8/2010 | Arai | B01D 61/44 205/742 |
| 2012/0145537 | A1 * | 6/2012 | Kuiphoff | C25B 1/46 204/237 |

FOREIGN PATENT DOCUMENTS

| | | |
|---|---|---|
| KR | 10-0660609 B1 | 12/2006 |
| KR | 10-2011-0112107 A | 10/2011 |

* cited by examiner

ELECTROLYSIS BATH FOR ACIDIC WATER AND METHOD FOR USING THE ACIDIC WATER

BACKGROUND

1. Field of the Invention

The present invention relates to an electrolytic bath for manufacturing acidic water and use of the acidic water, and more particularly, to an electrolytic bath for manufacturing acidic water capable of obtaining a high concentration of acidic reduced water or acidic oxidized water, especially, by applying the same polarity to a plurality of electrodes having one polarity and applying the same polarity to a plurality of electrodes having the other polarity through a mesh electrode without using an ion exchange resin, so that a reduction-oxidation (redox) reaction is facilitated by expanding an electrode surface that is a reaction area of the electrodes having different polarities and narrowing a distance between the electrodes, thereby electrolyzing reverse osmosis (RO) water or deionized (DI) water as well as tap water, and use of the acidic water.

2. Discussion of Related Art

A patent document (Korean Patent No. 10-0660609) disclosing an electrolytic bath for producing alkaline reduced water has been filed and registered. Such an electrolytic bath for producing alkaline reduced water is configured so that cathode electrodes coming in contact with an electrolyte are formed so that the cathode electrodes have a larger area than anode electrodes coming in contact with the electrolyte, the anode electrodes are anchored in an anode chamber with an open top surface, the cathode electrodes are anchored in a cathode chamber to be continuously disposed at a lateral surface of the anode chamber, outlets formed in the anode chamber are communicatively formed with inlets of the cathode chamber adjacent to the outlet, and an n–1$^{th}$ outlet of the continuously disposed outlets of the cathode chamber is in communication with an n$^{th}$ inlet of the cathode chamber adjacent to the n–1$^{th}$ outlet. According to such an invention, a change in liquidity may be achieved without addition of chemicals.

The alkaline reduced water produced thus is useful for washing off fine particles present on a surface of a semiconductor wafer or a photomask and has an effect of solving problems regarding damage of patterns and preventing oxidation of a surface of the semiconductor wafer or the photomask since only DI water or RO water is used as the raw material water. In particular, the alkaline reduced water has an effect of reducing environmental issues since drained water can be recycled at a low cost.

However, the electrolytic bath disclosed in the patent document has the following problems.

(1) Since a power source was independently applied to a plurality of electrodes having the same polarity, a potential difference for surfaces of these electrodes was not uniformly formed, which made it difficult to stabilize the surfaces of the electrodes.

(2) Since a conventional electrolytic bath used RO water or DI water as the raw material water, an ion exchange resin had to be used to enhance conductivity due to low conductance of the raw material water.

(3) When such an ion exchange resin was repeatedly used in the electrolytic bath, the heat resistance of the resin was degraded, and its lifespan was limited.

(4) In general, electrolysis was a decomposition reaction occurring on an electrode surface between a negative pole and a positive pole. Therefore, the conventional electrolytic bath had a problem in that electrolysis efficiency at a region that was not in direct contact with the electrode surface was deteriorated.

(5) Since the power source was independently supplied to the electrodes installed adjacent to each other to have the same polarity, it was difficult to stably expand the surfaces of the electrodes.

SUMMARY OF THE INVENTION

The present invention is designed to solve the problems of the prior art, and therefore it is an object of the present invention to provide an electrolytic bath for manufacturing acidic water capable of ensuring sufficient conductivity through wide surfaces of electrodes and stability of the surfaces of the electrodes to electrolyze tap water as well as RO water or DI water, especially, by coupling electrodes having the same polarity as one to apply a power source to the electrodes having the same polarity at the same time without using an additional catalytic agent or ion exchange resin, and use of the acidic water are provided.

While water having physical properties such as acidity and oxidizing power can be obtained at a positive pole and water having physical properties such as alkalinity and reducing power can be obtained at a negative pole when electrolysis is performed using a catalytic agent in a conventional electrolytic bath, it is another object of the present invention to provide an electrolytic bath for manufacturing acidic water capable of obtaining water having the physical properties of acidity and reducing power (acidic reduced water) at a cathode and water having the physical properties of acidity and oxidizing power (acidic oxidized water) at a positive pole without using a catalytic agent, and use of the acidic water.

It is still another object of the present invention to provide an electrolytic bath for manufacturing acidic water capable of obtaining a high concentration of acidic water by further forming mesh electrodes having a polarity different from the plurality of electrodes on a surface of an ion exchange membrane to widen an area of the electrodes and minimize a distance between the electrodes, thereby further facilitating a redox reaction, and use of the acidic water.

According to an aspect of the present invention, there is provided an electrolytic bath for manufacturing acidic water, which includes a housing 100 provided with at least two packing chambers 110a and 110b divided by at least one ion exchange membrane 111, each of the packing chambers 110a and 110b having a water inlet port 112a and 113a and a water outlet port 112b and 113b formed therein, first electrodes 200 installed at the packing chamber 110a, second electrodes 300 installed adjacent to the ion exchange membrane 111 in the packing chamber 110b and having a different polarity from the first electrodes 200, and third electrodes 300' having the same polarity as the second electrodes 300 and installed in the packing chamber 110b to be spaced predetermined distances from the second electrodes 300. Here, the second electrodes 300 and the third electrodes 300' are coupled to each other so that a power source is applied to the second electrodes 300 and the third electrodes 300' at the same time.

In particular, the ion exchange membrane 111 and the first electrodes 200 may be installed to be spaced a gap W1 of 0.1 to 2.0 mm from each other to have a filling space formed therebetween so as to allow passage of raw material water.

Also, the second electrodes 300 and the third electrodes 300' may be installed to be spaced a gap W2 of 0.1 to 100.0 mm from each other to have a filling space formed therebetween so as to allow passage of raw material water.

Meanwhile, the electrolytic bath for manufacturing acidic water according to the present invention may further include an ion tank 400 provided between the water inlet port 112a and the water outlet port 112b of the packing chamber 110a having the first electrodes 200 installed therein.

Also, the ion exchange membrane 111 may be a fluorine-based cation exchange membrane.

In addition, the first to third electrodes 200, 300 and 300' may be porous platinum electrodes, or mesh platinum electrodes.

Additionally, the ion exchange membrane 111 may be further provided with a mesh electrode 114 having the same polarity as the first electrodes 200 at a portion of a surface of the ion exchange membrane 111 facing the first electrodes 200. Here, the mesh electrode 114 may be formed at a size of 30 to 80%, based on the total size of one surface of the ion exchange membrane 111.

Meanwhile, the electrolytic bath for manufacturing acidic water according to the present invention may contain the acidic water having a dissolved hydrogen (DH) concentration of 200 ppb to 1,500 ppb.

In particular, using the electrolytic bath for manufacturing acidic water according to the present invention, acidic reduced water which is acidic (pH 4 to 6.9) and has a reducing power (ORP −100 mV to −650 mV) may be obtained at a negative pole by electrolyzing raw material water having a conductance of 50 μS/cm or less. Also, the acidic reduced water may be used as raw material water for antioxidants, raw material water for drinking water or drinks, edible water for microbial growth and cell growth, water for growth promotion and prevention of browning of vegetables or fruits, or raw material water for cosmetics.

Finally, using the electrolytic bath for manufacturing acidic water according to the present invention, acidic oxidized water which is acidic (pH 3.5 to 6.0) and has an oxidizing power (ORP +700 mV to +1,200 mV) is obtained at a positive pole by electrolyzing raw material water having a conductance of 50 μS/cm or less. Also, the acidic oxidized water may be used as sterile water, edible water for microbial growth and cell growth, water for growth promotion and prevention of browning of vegetables or fruits, or raw material water for cosmetics.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

Example 1

Figure 1:
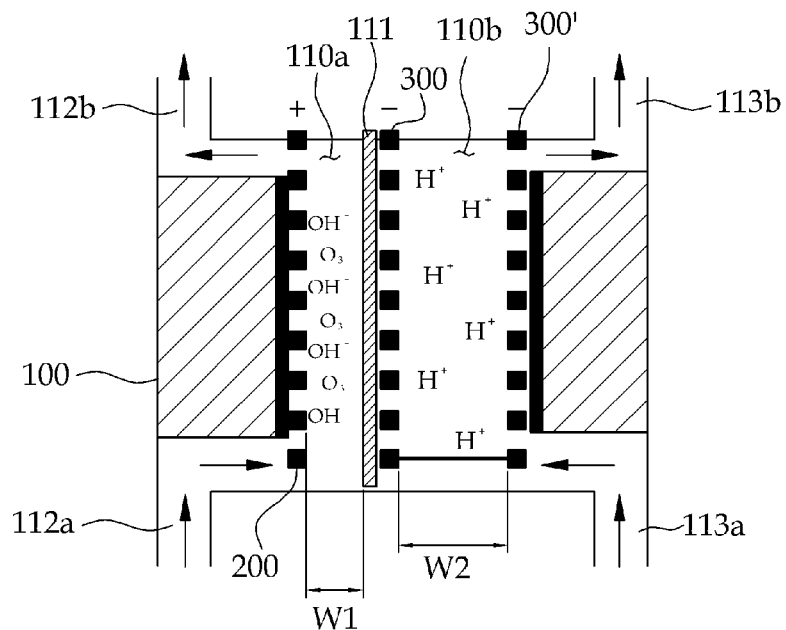
FIG. 1 is a schematic cross-sectional view showing a configuration of an electrolytic bath for manufacturing acidic water according to Example 1 of the present invention.

As shown in FIG. 1, the electrolytic bath for manufacturing acidic water according to Example 1 of the present invention includes a housing 100 configured to perform electrolysis, first electrodes 200 and second electrodes 300 having different polarities and installed in the housing 100 to supply a power source required for the electrolysis, and electrodes having the same polarity as ones of the electrodes to increase an amount of the corresponding ionic water so as to increase a potential difference, thereby obtaining acidic oxidized water or acidic reduced water.

In particular, the electrolytic bath for manufacturing acidic water according to the present invention includes packing chambers 110a and 110b, each of which is made of an ion exchange membrane 111 and formed in the housing 100 so that electrolyzed ions can be filled in a predetermined space.

Also, the electrolytic bath for manufacturing acidic water according to the present invention is configured so that the second electrodes 300 and other electrodes (third electrodes) having the same polarity as the second electrodes 300 can be coupled as one to apply a power source having the same intensity to the second electrodes 300 and the third electrodes at the same time, thereby enabling the supply of the power source having the same potential difference to the these electrodes and stable expansion of surfaces of the electrode.

Hereinafter, such a configuration of the electrolytic bath for manufacturing acidic water according to the present invention will be described in further detail.

The housing 100 is a body of an electrolytic bath into which a predetermined amount of raw material water is received to cause electrolysis.

The housing 100 is formed in a hollow form, and is provided with an ion exchange membrane 111 to separate electrolyzed ions. The ion exchange membrane 111 serves to divide the inside of the housing 100 into at least two packing chambers 110a and 110b. According to one exemplary embodiment of the present invention, the inside of the housing 100 has been described as being divided into two sections, but the inside of the housing 100 may be divided into a greater number of sections. According to one exemplary embodiment of the present invention, a fluorine-based cation exchange membrane (DuPont™ Nafion® 117) may be used as the ion exchange membrane.

Meanwhile, water inlet ports 112a and 113a configured to receive raw material water to be electrolyzed and water outlet ports 112b and 113b configured to exhaust electrolyzed acidic water are formed at each of the packing chambers 110a and 110b.

Here, the configuration in which the two packing chambers 110a and 110b are formed when one ion exchange membrane 111 is used as described above has been described. However, when the number of ion exchange membranes 111 used is "N," the number of packing chambers formed is (N+1). In this case, a water outlet port and a water inlet port are formed at each packing chamber.

The first electrodes 200 are installed at one packing chamber 110a. In this case, a filling space having a predetermined volume is ensured between the first electrodes 200 and the ion exchange membrane 111.

For this purpose, the first electrodes 200 are installed in the packing chamber 110a so that a gap W1 between the first electrodes 200 and the ion exchange membrane 111 is in a range of 0.1 to 2.0 mm. This is because electrolytic capacity of the second electrodes 300 as will be described below may be deteriorated when the gap W1 is higher than this gap range, and the flow of acidic water or raw material water may be disturbed when the gap W1 is lower than this gap range.

According to one exemplary embodiment of the present invention, when the first electrode 200 is mounted in the housing 100 provided with two or more packing chambers, the first electrode 200 is mounted at the outermost packing chamber.

The second electrodes 300 are installed in the packing chamber 110b so that the second electrodes 300 have the different polarity from the first electrodes 200 and are adjacent to the ion exchange membrane 111.

In this case, the packing chamber 110b having the second electrodes 300 installed therein is provided in a plural number, and one second electrode 300 may be installed at each packing chamber.

The third electrode 300' has the same polarity as the second electrodes 300, and is also installed in the packing chamber 110b having the second electrodes 300 installed therein.

In this case, the third electrode 300' is installed so that the third electrode 300' is spaced a predetermined gap W2 from the second electrodes 300. In this case, the gap W2 is in a range of 0.1 to 100.0 mm so that the gap W2 can be used as a filling space of ions between the third electrode 300' and the second electrodes 300.

Meanwhile, according to one exemplary embodiment of the present invention, porous platinum electrodes or mesh platinum electrodes may be used as the above-described first to third electrodes 200, 300 and 300'.

Also, according to one exemplary embodiment of the present invention, the second electrodes 300 and the third electrode 300' may be coupled to each other, for example, coupled in parallel to supply a power source to the electrodes at the same time. When the power source is simultaneously applied to the second electrodes 300 and the third electrode 300' to which the same polarity is applied, the potential difference in intensity is provided to the second electrodes 300 and the third electrode 300' to expand the surfaces of the electrodes uniformly.

Operations

Operations of the electrolytic bath for manufacturing acidic water according to the present invention having the same configuration as described above in Example 1 of the present invention will be described next.

First, raw material water is supplied into the housing 100 through the water inlet ports 112a and 113a. In this case, the raw material water may be supplied through only one of the two water inlet ports 112a and 113a.

Next, a positive pole (+) is applied to the first electrodes 200, and a negative pole (−) is applied to the second electrodes 300 and the third electrode 300'. Therefore, as the electrolysis of the raw material water occurs, $OH^-$ is charged into the packing chamber 110a to which the positive pole is applied through the ion exchange membrane 111, and $H^+$ is charged into the packing chamber 110b. In this case, when the second electrodes 300 and the third electrode 300' are coupled as one, a power source is applied to these electrodes at the same time.

As described above, when $OH^-$ and $H^+$ are charged into the packing chambers 110a and 110b, respectively, the flow of electric current is caused due to a potential difference of these ions. In particular, in the packing chamber 110b having the third electrode 300' installed therein, $H^+$ is considered to be converted into H or $H_2$ due to an increase in negative (−) ions.

Like this, the high potential difference obtained through charging of ions may be effectively used to electrolyze RO water or DI water having low conductance as well as widely used tap water.

<Change in Physical Properties According to Change in Gap Between Negative Poles>

To determine a change in physical properties of the acidic water obtained at the negative pole, that is, the above-described packing chamber 110b, according to a change in the gap W2, the following test was performed on the acidic water using the electrolytic bath for manufacturing acidic water according to present invention which operated as described above.

Raw material water: water (a conductance of 10 μS/cm or less, pH 7.0, ORP +230 mV, and a temperature of 25.5° C.)
  Power source: DC 24 V
  Flow speed (flow rate): 0.3 l/min
  Measuring machine: measuring system from TOA Co., Ltd.
  pH: TOA-21P
  ORP: TOA-21P
  DH: TOA DH-35A
The measured results are listed in the following Table 1.

TABLE 1

| Gap/Physical properties | pH[1] | ORP[2] | DH[3] |
|---|---|---|---|
| 2 mm | 4.82 | −653 mV | 1.43 ppm |
| 5 mm | 5.05 | −620 mV | 1.21 ppm |
| 10 mm | 5.37 | −586 mV | 0.97 ppm |
| 20 mm | 5.83 | −534 mV | 0.81 ppm |
| 30 mm | 6.20 | −508 mV | 0.77 ppm |
| 40 mm | 6.42 | −472 mV | 0.68 ppm |
| 50 mm | 6.75 | −426 mV | 0.52 ppm |
| 60 mm | 6.81 | −398 mV | 0.43 ppm |
| 70 mm | 6.98 | −327 mV | 0.32 ppm |

[1]pH: Potential of Hydrogen
[2]ORP: Oxidation Reduction Potential
[3]DH: Dissolved Hydrogen As listed in Table 1, it was revealed that the electrolyzed water obtained in the present invention was generally acidic, and strongly acidic especially when the gap W2 narrowed, and the redox potential (ORP) also increased as the gap W2 widened. As a result, it could be seen that the electrolyzed water obtained thus was acidic reduced water.

<Measurement Example of Oxidizing Power at Positive Pole>

Changes in physical properties such as oxidizing power according to a change in electric current in the packing chamber provided with the positive poles of the water electrolytic bath for manufacturing acidic water according to the present invention were measured as follows.

Raw material water: water (a conductance of 10 μS/cm or less, pH 7.0, ORP +230 mV, and 25.5° C.)
  Power source: DC 24 V
  Flow speed (flow rate): 0.3 l/min
  Measuring machine: measuring system from TOA Co., Ltd.
  pH: TOA-21P
  ORP: TOA-21P
The measured results are listed in the following Table 2.

TABLE 2

| Electric current (A) | Voltage (V) | ORP[1] (mV) | pH[2] |
|---|---|---|---|
| 0.5 | 6.0 | +995 | 4.80 |
| 1.0 | 8.5 | +1041 | 4.46 |
| 1.5 | 10.5 | +1952 | 4.41 |
| 2.0 | 12.0 | +1060 | 4.39 |
| 2.5 | 12.9 | +1067 | 4.34 |
| 3.0 | 14.1 | +1073 | 4.28 |

[1]ORP: Redox Potential
[2]pH: Potential of Hydrogen

As listed in Table 2, it was revealed that the redox potential (ORP) increased as the intensity of electric current increased, and the pH of the electrolyzed water was closer to acidity due to an increase in oxidizing power and a decrease in pH.

<Harmfulness Test on Acidic Water (Hydrogen Water)>
(1) Effect of Hydrogen Water at Cathode on Retina of Eye Retinal ischemia-reperfusion (IR) damage caused by a temporary increase in intraocular pressure (IOP) has been known to generate active oxygen and cause damage of nerve cells.

Laboratory mice were subjected to increased IOP for 60 minutes to induce ischemia. During an ischemia-reperfusion period, hydrogen-saturated saline eye drops composed of the acidic hydrogen water according to the present invention were ocularly administered to laboratory mice.

As a result, a concentration of hydrogen ions in the vitreous body increased, and IR-induced OH was reduced. The eye drops reduced the retinal cell death and the number of oxidative stress marker-positive cells, and inhibited a decrease in retinal thickness according to activation of Muller glial cells, astrocytes and microglial cells.

The eye drops restored at least 70% of the retinal thickness.

(2) Immediate-Type Allergic Reaction

An immediate-type allergic reaction was observed in mice taking in the hydrogen water (hydrogen 1.0 ppm) obtained at the negative poles of the electrolytic bath for manufacturing acidic water according to the present invention.

Hydrogen in the RBL-2H3 mast cells of the mice inhibited FcεRI-associated Lyn phosphorylation and downstream signal transduction (which inhibited NADPH oxidase activities and reduced generation of oxygenated water).

(3) Test for Measuring Anti-Oxidant Power of Hydrogen Water Obtained at Negative Pole Four-week-old male ICR mice were adapted for a week, and allowed to freely take in food and hydrogen water for 15 days. The control was allowed to take in tap water. To prevent a decrease in concentration of hydrogen water, the hydrogen water was replaced three times a day. When administration of a sample was completed, the mice were anesthetized with ether, and blood was drawn from the hearts. The drawn blood was put into a test tube containing an anticoagulant to separate plasma.

The total anti-oxidant power of the plasma was measured using a kit for measuring a total anti-oxidant status (Randox, U.K.). To check a physical activity promotion effect, an immobility time was measured while the mice were forced to swim for 6 minutes. That is, a circular cylindrical tube (with a height of 25 cm and a diameter of 10 cm) was filled with water having a temperature of 23 to 25° C. to a depth of 10 cm, and an immobility time was measured 4 minutes before the test completion. In this case, an upright posture of a mouse floating passively while keeping its head above water was referred to as "immobility."

After the forced swim test, the mice were anesthetized with ether, and blood was drawn from the hearts. The drawn blood was centrifuged at 4° C. and 3,000 rpm for 10 minutes to obtain a serum.

Blood urea nitrogen, creatine kinase, lactic dehydrogenase, glucose and total proteins of the serum were measured using an autoanalyzer (Hitachi 747. Hitachi, Japan). The measured values were analyzed using the Student's t-test, and indicated by M±SEM.

Oxygen is an essential element to living organisms that perform aerobic respiration, but active oxygen produced when incomplete reduction occurs during energy metabolism causes deformation and destruction of t molecules in cells, thus breaking the homeostasis in the cells and thereby inducing cell death. Active oxygen is produced by factors such as cigarettes, smoke and the like, and causes various diseases to develop by causing damage to biological components such as proteins, DNA, enzymes, T cells, and the like. In particular, active oxygen is known to cause aging and adult diseases by attacking an unsaturated fatty acid that is a component of a biological membrane and producing lipid peroxide.

Five-week-old ICR mice were allowed to freely take in hydrogen water for 15 days, and plasma was separated to measure a total anti-oxidant power. The results are listed in the following Table 3.

TABLE 3

Measurement results of effect of administration of hydrogen water on total oxidizing power of mouse plasma [1]

| Items | Relative Trolox concentration (nmol/ml plasma) |
|---|---|
| Control (Comparative Example) | 1.24 ± 0.06 |
| Hydrogen water (Example) | 1.46 ± 0.13* |

[1] Average value ± SEM, n = 10
[2] Water-soluble vitamin E analogue
*$P < 0.05$, compared to the control As a result, the total anti-oxidant power of the hydrogen water-administered group significantly increased by 18%, compared to the tap water-administered control ($P<0.05$). The total anti-oxidant power of the plasma could be considered to be a value representative of the anti-oxidant power in the body, and an increase in the total anti-oxidant power of the plasma indicated an increase in the anti-oxidant power in the body by the intake of the hydrogen water. From these results, it was revealed that the hydrogen water was able to protect the living bodies from various diseases and aging caused by various factors by causing an increase in biological anti-oxidant power in the body.

The forced swim test was used to examine anti-fatigue and endurance activities. Five-week-old ICR mice were allowed to take in hydrogen water for 15 days, and the forced swim test was performed to measure an immobility time. Then, a blood biochemical examination was also performed. In the forced swim test using the mice, the immobility time of the mice taking in the hydrogen water significantly decreased by 13%, compared to the control (see Table 4). This indicated that the intake of the hydrogen water served to increase the anti-fatigue and endurance activities, and thus cut down the immobility duration.

TABLE 4

Effect of intake of hydrogen water on immobility time (seconds) in forced swim test using mice [1]

| | Comparative Example | Example (hydrogen water group) |
|---|---|---|
| Before intake | 190 ± 13 | 193 ± 11 |
| After intake | 224 ± 8 | 195 ± 7* |

[1] Average value ± SEM, n = 10
*$P < 0.05$, compared to the control

Blood urea nitrogen that was a fatigue-associated blood biochemical marker, creatine kinase and lactic dehydrogenase decreased by 15%, 22% and 9%, respectively, and glucose and total proteins increased by 9% and 19%, respectively, indicating that all the measured values increased due to the intake of the hydrogen water (see Table 5).

Therefore, it was proven that the intake of hydrogen water had a physical activity promotion effect and an anti-fatigue effect.

TABLE 5

Effect of intake of hydrogen water on blood biochemical marker for mice [1]

| | Control | Hydrogen water group |
|---|---|---|
| Blood urea nitrogen (mg/dl) | 22.0 ± 0.9 | 18.8 ± 0.6* |
| Creatine kinase (mg/dl)) | 0.36 ± 0.03 | 0.28 ± 0.02* |
| Lactic dehydrogenase (U/I) | 988 ± 167 | 896 ± 171 |
| Glucose (mg/dl) | 219 ± 13 | 238 ± 14 |
| Total proteins (g/dl) | 4.3 ± 0.1 | 5.1 ± 0.1* |

[1] Average value ± SEM, n = 10
*$P < 0.05$, compared to the control

As described above, the present invention was characterized in that the acidic reduced water was obtained by filling dissociated ions through a filling space to enhance a potential difference, and the acidic oxidized water was obtained by changing the polarity of the acidic water.

Example 2

The electrolytic bath for manufacturing acidic water according to Example 2 of the present invention further included an ion tank 400 installed in the housing 100 of Example 1, compared to the configuration of Example 1. Here, the like components of Example 2 having the same configuration as in Example 1 are referred to with like numbers, and detailed description thereof is omitted for clarity.

Figure 2:
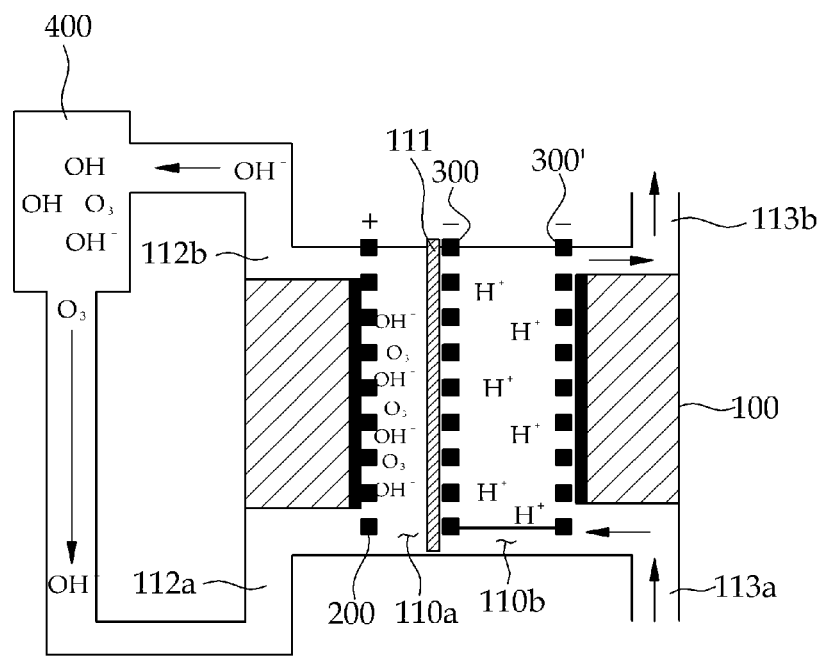
FIG. 2 is a schematic cross-sectional view showing a configuration of an electrolytic bath for manufacturing acidic water according to Example 2 of the present invention.

As shown in FIG. 2, the ion tank 400 was installed between the water inlet port 112a and the water outlet port 112b of the housing 100 to store ions charged in the packing chamber 110a by means of the first electrodes 200.

Therefore, the electrolytic bath for manufacturing acidic water according to Example 2 of the present invention caused a higher potential difference in proportion to an amount of ions stored in the ion tank 400, and the oxidizing and reducing powers were increased accordingly.

Example 3

Figure 3:
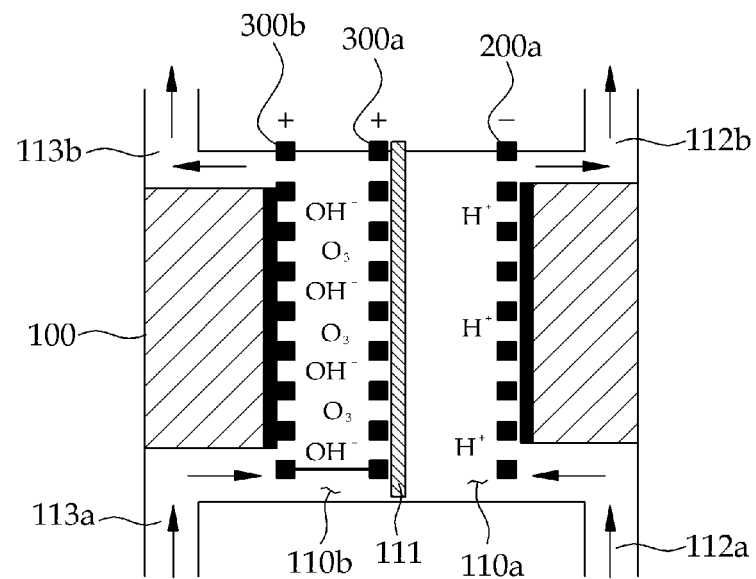
FIG. 3 is a schematic cross-sectional view showing a configuration of an electrolytic bath for manufacturing acidic water according to Example 3 of the present invention.

As shown in FIG. 3, the electrolytic bath for manufacturing acidic water according to Example 3 of the present invention functioned to apply different polarities to the electrodes. Here, the like components of Example 3 having the same configuration as in Example 1 are referred to with like numbers, and detailed description thereof is omitted for clarity.

That is, the electrolytic bath for manufacturing acidic water of Example 3 was configured so that a negative pole (−) was applied to a first electrode 200a and a positive pole (+) was applied to a second electrode 300a and a third electrode 300b.

Therefore, the acidic water which was acidic and reductive was able to be obtained in Example 1, but the acidic water which was acidic and highly oxidative was able to be obtained in Example 3.

Example 4

Figure 4:
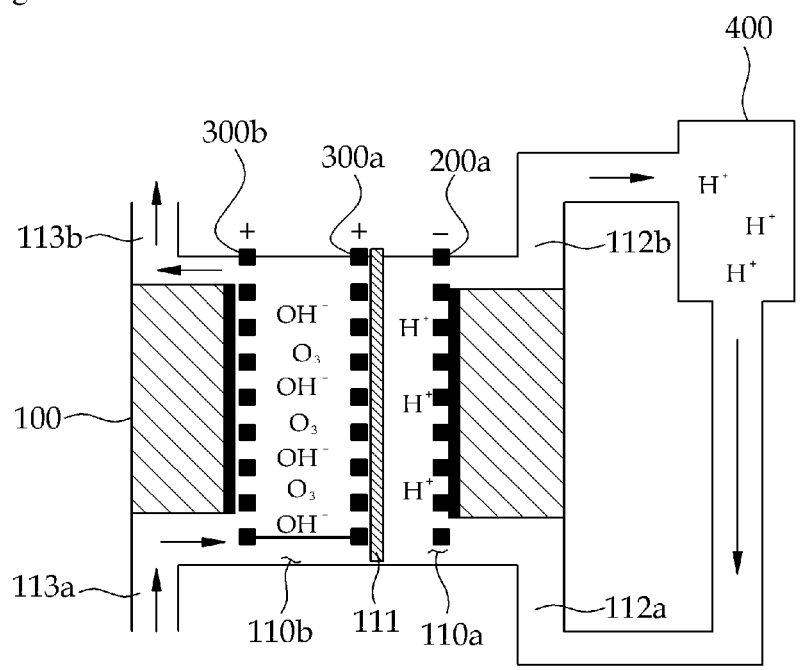
FIG. 4 is a schematic cross-sectional view showing a configuration of an electrolytic bath for manufacturing acidic water according to Example 4 of the present invention.

As shown in FIG. 4, the electrolytic bath for manufacturing acidic water according to Example 4 of the present invention further included an ion tank 400 installed in the housing 100 of Example 3. Here, the like components of Example 4 having the same configuration as in Example 3 are referred to with like numbers, and detailed description thereof is omitted for clarity.

Therefore, the electrolytic bath for manufacturing acidic water according to Example 4 of the present invention caused a higher potential difference in proportion to an amount of ions stored in the ion tank 400 to obtain acidic water having higher acidity accordingly.

(Use Invention)

The acidic reduced water obtained from the electrolytic bath according to the present invention was characterized in that it was obtained by electrolyzing raw material water having a conductance of 50 μS/cm or less so that it was acidic (pH 4 to 6.9) and had a reducing power (ORP −100 mV to −650 mV) at the negative pole. Also, such acidic reduced water was characterized in that it had a DH concentration of 200 ppb to 1,500 ppb. Accordingly, the acidic reduced water according to the present invention was able to be used as raw material water for antioxidants, raw material water for drinking water or drinks, edible water for microbial growth and cell growth, water for growth promotion and prevention of browning of vegetables or fruits, and raw material water for cosmetics.

Meanwhile, the acidic oxidized water obtained from the electrolytic bath according to the present invention was characterized in that it was obtained by electrolyzing raw material water having a conductance of 50 μS/cm or less so that it was acidic (pH 3.5 to 6.0) and had an oxidizing power (ORP +700 mV to +1,200 mV) at the positive pole. Such acidic reduced water was used as sterile water, edible water for microbial growth and cell growth, water for growth promotion and prevention of browning of vegetables or fruits, or raw material water for cosmetics.

Example 5

Figure 5:
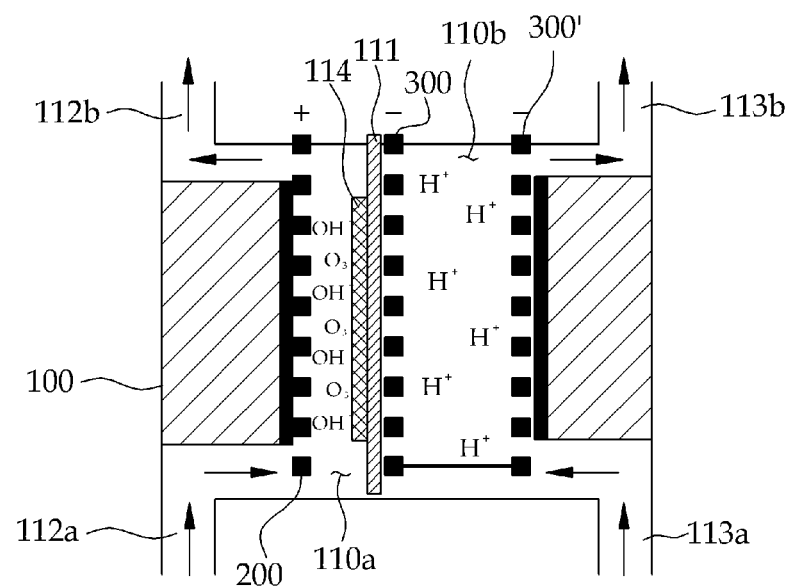
FIG. 5 is a schematic cross-sectional view showing a configuration of an electrolytic bath for manufacturing acidic water according to Example 5 of the present invention.

As shown in FIG. 5, the electrolytic bath for manufacturing acidic water according to Example 5 of the present invention further included a mesh electrode 114 installed at the ion exchange membrane 111, compared to the configuration of Example 1. Here, the like components of Example 5 having the same configuration as in Example 1 are referred to with like numbers, and detailed description thereof is omitted for clarity.

A mesh electrode was an electrode manufactured in a mesh form, and thus a surface area of the electrode was able to expand, and the electrode flexible so that there was no limitation on installation sites. Also, the mesh electrode facilitated the flow of raw material water or hydrogen water due to its mesh form, and also narrowed a distance between the reacting electrodes, thereby promoting a redox reaction.

In the present invention, the mesh electrode 114 formed using such a conventional technique was installed at one surface of the ion exchange membrane 111 facing the first electrodes 200, and the same power source as in the first electrodes 200 was applied to the mesh electrode 114. In this case, the power source was able to be applied separately, but the first electrodes 200 and the mesh electrode 114 were coupled as one so that application of the power source was started and stopped at the same time.

According to one exemplary embodiment of the present invention, the mesh electrode 114 was also able to be manufactured at the same size as one surface of the ion exchange membrane 111, but was preferably manufactured at a smaller size, more preferably at a size of 30 to 80%, based on the total area of the ion exchange membrane 111. This was to facilitate floating of acidic water as well as to reduce interference caused by exchange of ions flowing in/out through the ion exchange membrane 111.

The mesh electrode 114 installed thus had the same polarity as the first electrodes 200, and was incompatible with the second electrodes 300 disposed opposite to the ion exchange membrane 111. As a result, a redox reaction between these electrodes occurred. In this case, since a reaction distance between the mesh electrode 114 and the second electrodes 300 was minimized, and especially since the mesh electrode 114 was manufactured in the mesh form, the redox reaction occurring between these electrodes was further facilitated.

Also, although the configuration of the mesh electrode 114 according to the present invention has been described in the same manner as in the installation at the ion exchange membrane 111 of Example 1, it should be apparent to those skilled in the art that the configuration of the mesh electrode 114 is applicable to other Examples.

As described above, the electrolytic bath for manufacturing acidic water according to the present invention can be configured to obtain a high concentration of acidic reduced water or acidic oxidized water by simultaneously applying a power source to a plurality of electrodes having one polarity and applying the same polarity to a plurality of electrodes having the other polarity using a mesh electrode so as to widen an area of the electrodes in which a redox reaction occurs and minimize a distance between the reacting electrodes, thereby further facilitating such a redox reaction.

The electrolytic bath for manufacturing acidic water according to the present invention and the use of acidic water have the following effects.

(1) Since at least two electrodes having the same polarity are coupled as one and a power source is applied to these electrodes at the same time, a wide surface area of the electrodes can be stably ensured due to the configuration of the electrodes, which leads to an improved redox reaction effect.

(2) Since the ion exchange membrane is used without using an ion exchange resin, unlike the conventional ion exchange resin, problems such as degradation of durability are not caused, thereby expanding the lifespan of the electrolytic bath.

(3) Even when RO water or DI water as well as tap water having high conductance due to the presence of a large amount of foreign substances is used as the raw material water for electrolysis, acidic water can be obtained by electrolyzing such water.

(4) The acidic reduced water or the acidic oxidized water can be selectively obtained by electrolyzing raw material water according to the polarity applied to the packing chamber.

(5) The acidic oxidized water or acidic reduced water obtained thus can be widely used as raw material water according to the characteristics of the acidic oxidized water or acidic reduced water.

(6) In particular, in the present invention, as the raw material water is allowed to flow between the cathode electrodes installed to be spaced apart at predetermined distances, an electrolytic reaction can occur on surfaces of the cathodes to produce high-concentration hydrogen water (acidic water).

(7) Since the mesh electrode can be used to widen a reaction area (an electrode area) and narrow a distance between the reacting electrodes, a redox reaction can be facilitated to cause an increase in concentration of hydrogen water.

(8) Especially, since such a mesh electrode is formed at a smaller size, preferably at a size of 30 to 80% of the total area of the ion exchange membrane in order to facilitate the flow of acidic water, a filling space can be ensured to facilitate the flow of acidic water, and a redox reaction can be facilitated to increase a concentration of hydrogen in the acidic water.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An electrolytic bath for manufacturing acidic water, comprising:
    a housing provided with at least two packing chambers divided by at least one ion exchange membrane, each of the packing chambers having a water inlet port and a water outlet port formed therein;
    first electrodes installed at a first packing chamber;
    second electrodes installed adjacent to the ion exchange membrane in a second packing chamber and having a polarity different from the first electrodes; and
    third electrodes having the same polarity as the second electrodes and installed in the second packing chamber to be spaced predetermined distances from the second electrodes,
    wherein the second electrodes and the third electrodes are coupled to each other so that a power source is applied to the second electrodes and the third electrodes at the same time,
    wherein the ion exchange membrane is further provided with a mesh electrode having the same polarity as the first electrodes at a portion of a surface of the ion exchange membrane facing the first electrodes.

2. The electrolytic bath of claim 1, wherein the ion exchange membrane and the first electrodes are installed to be spaced a gap W1 of 0.1 to 2.0 mm from each other to have a filling space formed therebetween so as to allow passage of raw material water.

3. The electrolytic bath of claim 1, wherein the second electrodes and the third electrodes are installed to be spaced a gap W2 of 0.1 to 100.0 mm from each other to have a filling space formed therebetween so as to allow passage of raw material water.

4. The electrolytic bath of claim 3, further comprising an ion tank provided between the water inlet port and the water outlet port of the packing chamber having the first electrodes installed therein.

5. The electrolytic bath of claim 4, wherein the ion exchange membrane is a fluorine-based cation exchange membrane.

6. The electrolytic bath of claim 5, wherein the first to third electrodes are porous platinum electrodes or mesh platinum electrodes.

7. The electrolytic bath of claim 5, wherein the water electrolyzed in the electrolytic bath has a dissolved hydrogen (DH) concentration of 200 ppb to 1,500 ppb.

8. The electrolytic bath of claim 7, wherein acidic reduced water which is acidic (pH 4 to 6.9) and has a reducing power (ORP −100 mV to −650 mV) is obtained at a negative pole by electrolyzing raw material water having a conductance of 50 μS/cm or less.

9. The electrolytic bath of claim 7, wherein acidic oxidized water which is acidic (pH 3.5 to 6.0) and has an oxidizing power (ORP+700 mV to +1,200 mV) is obtained at a positive pole by electrolyzing raw material water having a conductance of 50 μS/cm or less.

10. The electrolytic bath of claim 1, wherein the mesh electrode is formed at a size of 30 to 80%, based on the total size of one surface of the ion exchange membrane.

* * * * *